No. 806,642. PATENTED DEC. 5, 1905.
R. CHASSE.
ANIMAL TRAP.
APPLICATION FILED MAR. 27, 1905.
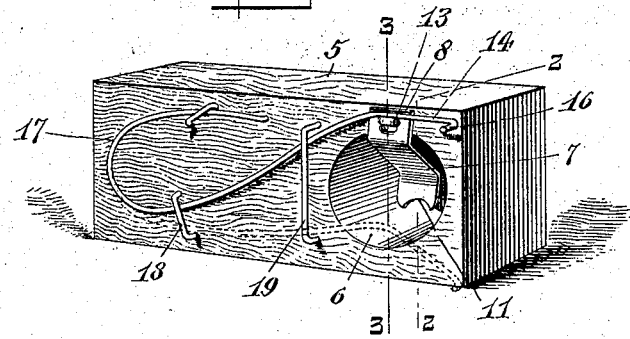
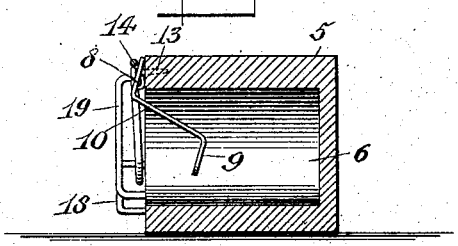
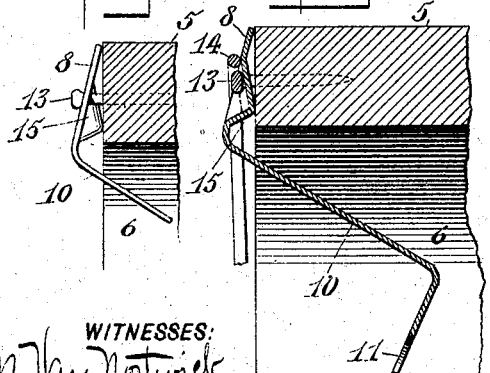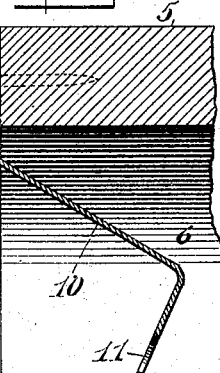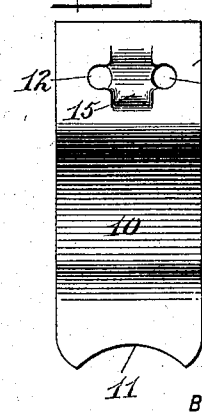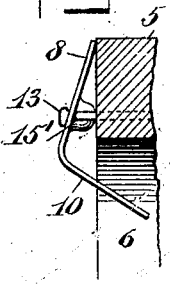
WITNESSES:
M. Van Nortwick
N. B. Smith
INVENTOR
Raphael Chasse
BY George Cook
ATTORNEY

UNITED STATES PATENT OFFICE.

RAPHAEL CHASSE, OF MIDDLETOWN, NEW YORK, ASSIGNOR TO CHASSE MANUFACTURING COMPANY, OF MIDDLETOWN, NEW YORK, A CORPORATION OF NEW YORK.

ANIMAL-TRAP.

No. 806,642.

Specification of Letters Patent.

Patented Dec. 5, 1905.

Application filed March 27, 1905. Serial No. 252,144.

*To all whom it may concern:*

Be it known that I, RAPHAEL CHASSE, a citizen of the United States, and a resident of Middletown, in the county of Orange and State of New York, have made and invented certain new and useful Improvements in Animal-Traps, of which the following is a specification.

My invention relates to an improvement in animal-traps, and more particularly to mouse-traps, the object of the same being to provide a trap which may be easily and readily set without danger of being sprung during the setting operation and which at the same time will be very sensitive to any movement of the tripping-arm.

A further object of my invention is to provide a trap which will be economical in construction and of but few parts, which may be easily and readily assembled.

With these and other ends in view the invention consists in certain novel features of construction and combinations of parts, as will be hereinafter fully described, and pointed out in the claims.

In the accompanying drawings, Figure 1 is a view of my improved trap in its set adjustment. Fig. 2 is a sectional view taken on the line 2 2 of Fig. 1. Fig. 3 is an enlarged sectional view taken on the line 3 3 of Fig. 1. Fig. 4 is a detached enlarged view of the tripping-arm. Fig. 4ª is an enlarged and partly-sectional view of a part of the trap, and Fig. 4ᵇ a similar view showing a rounded and hemispherical-shaped bearing.

Referring to the drawings, 5 represents the base or body of the trap, preferably made of wood and formed with the well or receptacle 6. It will of course be understood that any number of these wells may be employed and the trapping mechanism duplicated; but in its simplest form it will be made with but one receptacle, as illustrated in Fig. 1. Into this well or receptacle 6 extends the tripping-arm 7, preferably bent, as illustrated in the several figures of the drawings—that is, with the upper vertical end 8, lower vertical end 9, and the intermediate slanting portion 10, the lower end 9 being slightly curved or hollowed out, as shown at 11, the arm when so shaped and when in its set position extending backwardly or inwardly into the well or receptacle 6, as illustrated in Figs. 1, 2, and 3. In the upper end 8 of the arm are formed two circular openings 12, through which passes a staple 13, pivoting or hinging the arm to the block or base 5, the rounded portion or bend of the staple extending outwardly and slightly beyond the surface of the end 8 of the arm 7 a sufficient distance to allow the spring 14 to rest thereon when the trap is set.

In the manufacture of the trap care should be taken that the staple extend the required distance beyond the surface of the arm, as otherwise it will be impossible for the spring to rest thereon, and therefore impossible to set the trap. On the other hand, it should not extend outwardly too far, as in such event the trap will not be sufficiently sensitive in that too great a movement of the end 8 of the arm will be required in order to force the spring 14 off of the staple. As the blocks 5 in practice are usually made by machinery and uniform in size, the machine for driving the staples into the block is so set or adjusted as to drive them down a certain predetermined distance, so that I have experienced no difficulty whatever in having the bend of the staple extend outwardly to exactly the proper distance.

When forming the two holes or openings 12, I simultaneously strike the metal between them downwardly, forming a bearing 15, upon which the arm rocks, the bearing-point being formed as far below the openings 12 as possible in order that the distance from said bearing-point to that part of the arm against which the spring rests is greatest possible. In other words, the lever extending from the bearing-point of the arm to that portion thereof against which rests the spring 14 should be as long as possible, so that a slight movement of the opposite end 9 of the arm will result in as great a movement as possible of the upper end 8, thus rendering the trap very sensitive. The metal between the openings 12 is struck downwardly to form a bearing, which gradually rises to the highest point and is then quickly or sharply bent to merge into the metal of the arm, as illustrated in Fig. 4ª, the effect being that the end 8 of the arm tilts or moves outwardly suddenly when the lower end 9 is moved or forced inwardly in the well or receptacle 6, and by reason of the fact that the highest or bearing point of the struck-down metal is lowered or removed a considerable distance below the place where the free end of the spring 14 bears against the end 8 of the arm said end 8 will move a sufficient distance to throw the end of the spring off of the bend of the staple upon a slight inward movement of the end 9. Heretofore I have struck the metal downwardly between the openings in the form of an arc or sector of a circle, as illustrated at 15', Fig. 4$^b$, but by numerous experiments have learned that to shape the struck-down metal, as above described, and shown in Fig. 4$^a$, results in rendering the trap far more sensitive, in that the bearing-point in the latter is constant—that is, at the highest point of the struck-down metal—while in the instance of a rounded bearing the bearing-point constantly changes as the tripping-arm moves.

The extreme end 16 of the spring 14 is bent at right angles to facilitate the setting of the same, the opposite end 17 being curved and held in position by means of the staples 18, the staple 19 being also utilized for guiding the free end of the spring in its vertical movement.

In practice the bait is inserted in the well or receptacle 6 behind the arm 7. The free end of the spring is then raised and placed over and upon the bend of the staple 13. As the mouse forces backwardly the lower end 9 of the arm in order to reach the bait, the forward movement of the end 8 forces the free end of the spring off of the staple, the spring thereupon assuming the position as shown in dotted lines, Fig. 1, and gripping the mouse between itself and the block or base.

I am aware that traps have heretofore been made or formed with a receptacle or well into which extends the tripping-arm, the latter being adapted to release the free end of the spring; but I am not aware that any tripping-arm has been made wherein the metal between the staple-openings has been struck downwardly to form a bearing like that herein shown and described, and, Therefore, having fully described my invention, what I claim as new, and desire to secure by Letters Patent, is—

1. In an animal-trap, the combination with a body formed with a bait-receptacle, of a spring secured at one end to said body and a tripping-arm pivoted to said body and extending inwardly into said receptacle, and with which tripping-arm engages the free end of said spring, the metal of the pivoted end of said tripping-arm being struck inwardly to form a bearing-point, substantially as described.

2. An animal-trap, comprising a body formed with a bait-receptacle, a tripping-arm and spring engaging therewith, said tripping-arm being formed with two openings therein for the passage of a retaining-staple, the metal between and below said openings being struck inwardly to form a bearing-point for said tripping-arm, substantially as described.

3. An animal-trap comprising a body formed with a bait-receptacle, a spring secured thereto and a tripping-arm, one end of said tripping-arm being formed with two circular openings for the passage of a retaining-staple, the metal between and below said openings being struck inwardly to form a bearing, the metal of the bearing gradually increasing in height to the highest point and then sharply bent to merge into the arm, substantially as described.

Signed at Middletown, in the county of Orange and State of New York, this 22d day of March, A. D. 1905.

RAPHAEL CHASSE.

Witnesses:
 D. B. CONKLING,
 HENRY B. WISNER.